United States Patent [19]

Badoureaux

[11] Patent Number: 5,131,145
[45] Date of Patent: Jul. 21, 1992

[54] PROCESS FOR OBTAINING A HERMETIC CONNECTION FOR RIGID TUBE

[75] Inventor: Jean-Pierre Badoureaux, Viuz En Sallaz, France

[73] Assignee: Parker Hannifin RAK, Annemasse, France

[21] Appl. No.: 472,159

[22] Filed: Jan. 30, 1990

[30] Foreign Application Priority Data

Jan. 30, 1989 [FR] France .................. 89 01373

[51] Int. Cl.$^5$ ............................ B23P 19/04
[52] U.S. Cl. .................. 29/890.144; 29/465; 29/512; 29/523; 285/334.5
[58] Field of Search ........ 29/890.144, 890.15, 29/465, 512, 523; 285/334.5, 382, 354, 349; 72/370

[56] References Cited

U.S. PATENT DOCUMENTS

| 168,970 | 10/1975 | Caswell | 29/890.144 |
|---|---|---|---|
| 3,042,965 | 7/1962 | Gray, Jr. et al. | 29/890.15 |
| 3,590,455 | 7/1971 | Harris | 29/890.144 |
| 3,606,659 | 9/1971 | Robbins | 29/890.15 |
| 3,668,754 | 6/1972 | Boast | 285/354 |
| 4,761,873 | 8/1988 | Wetzel et al. | 29/890.144 |
| 4,809,418 | 3/1989 | Burli | 29/512 |

Primary Examiner—Irene Cuda
Attorney, Agent, or Firm—Christopher H. Morgan

[57] ABSTRACT

In a tube fitting a nut which extends about the end of a tube allows the tube to be threadedly joined to a nipple. The end of the tube is formed in the shape of a collar which retains the nut. The face of the collar is flattened to sealingly meet with an o-ring which resides in an annular recess in the frontal surface of the nipple. The process of forming the collar in the end of the tube includes placing a nut on the tube, gripping the end of the tube with a die, and deforming the end of the tube with a tool of truncated cone-shape move in an advancing, precessing motion. The die is shaped with interior shoulders having the profile of the collar. A socket which forms the back side of the collar can be placed over the tube after the die grips the tube. After the collar formed the dies is removed.

3 Claims, 2 Drawing Sheets

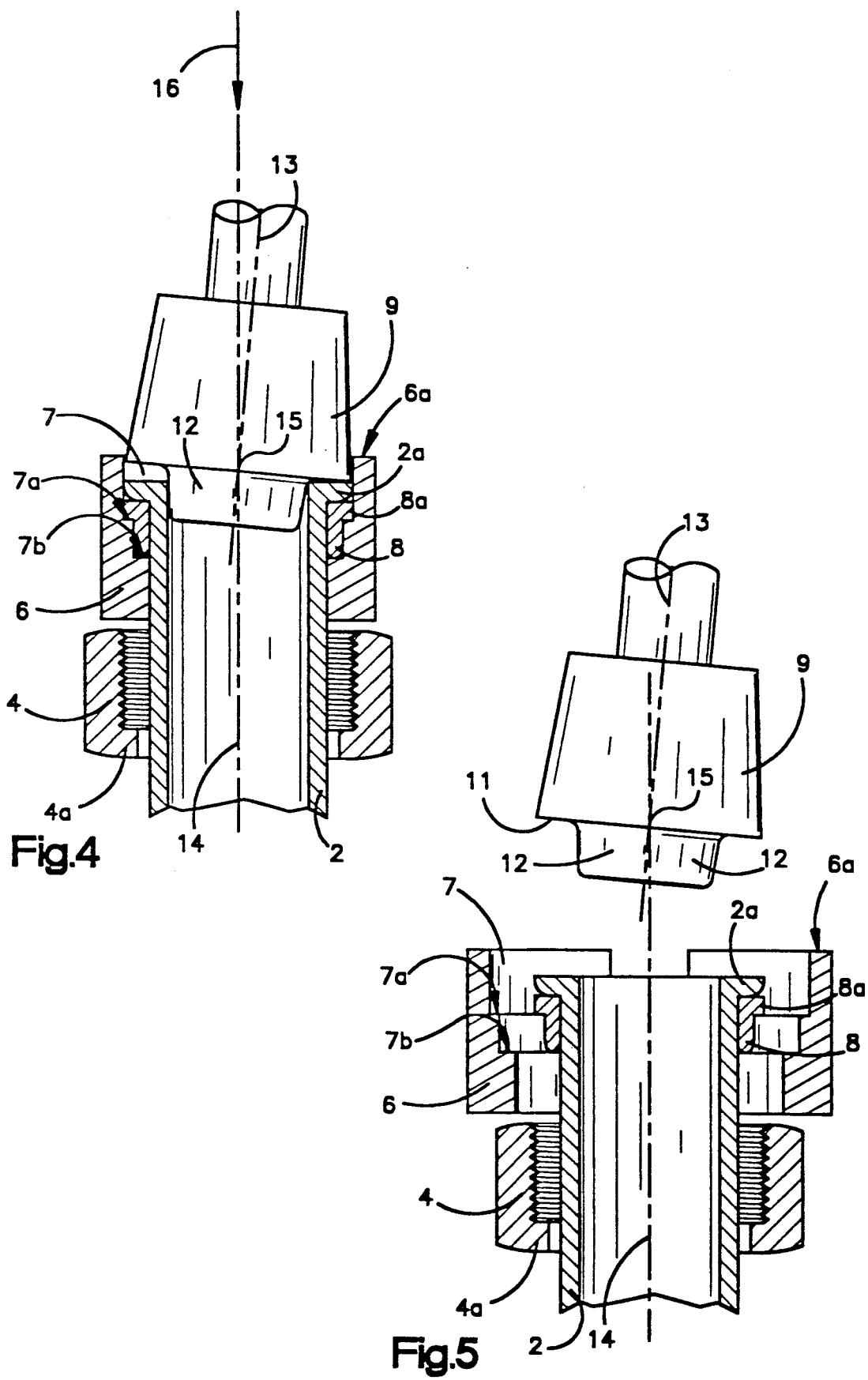

PROCESS FOR OBTAINING A HERMETIC CONNECTION FOR RIGID TUBE

BACKGROUND OF THE INVENTION

This invention relates to a process for obtaining a hermetic connection between a rigid tube or pipe and an apparatus. It also relates to a method of forming a connectable pipe end.

In installations for carrying hydraulic or pneumatic fluids under pressure, the rigid connection of the rigid tubes to different openings of the apparatus of the installation is generally obtained by means of a female screw or nut. The nut is retained on the tube or pipe by a collar which extends from the end of tube or pipe. The nut has an inwardly extending shoulder which abuts the collar of the tube when tube is connected making the female screw or nut a prisoner of the tube. A threaded nipple, forming a portion of and solid with the opening of the apparatus to which the tube is to be connected, threadedly receives the nut to join the tube to the apparatus. The frontal surface of the nipple, against which the face of the collar of the tube abuts, has a sealing joint, arranged in an annular throat to provide a sealed connection between the joined ends.

In prior art connections of this type, the collar of the tube is a beaten collar, that is, it is obtained by placing the end of a tube in a die and striking it with a succession of calibrated tools. The successive beating application of the tools to the tube progressively deforms the end of the tube until the desired collar shape is obtained. This is a time consuming and costly process.

This invention is intended not only to decrease the time of manufacture of such a connection, but also to reduce its cost.

SUMMARY OF THE INVENTION

For this purpose, the collar of the tube is obtained by deforming the end of the tube in which the collar is to be formed with a truncated cone-shaped tool or backup plate. First the shouldered female screw or nut is placed on the tube. Next, the end of the tube is gripped in a removable working die which has an imprint shouldered to the profile of collar desired. Then the truncated cone-shaped tool is applied in an advancing, precessing motion to deform the end of the tube into the die to form the collar. To prevent the joining plane of the two working parts of the die from leaving undesirable traces on the collar of the tube, according to one preferred mode of application of the invention, the portion of the working die adjacent the tube consists of a shouldered socket. This socket is designed to remain prisoner about the tube between the collar and the shouldered female screw or nut. This socket has a cylindrical skirt designed to be disposed between the tube and the inner shoulder of the female screw and an outer shoulder designed to rest against the inner shoulder of the female screw or nut.

At any rate, the invention will be well understood with the aid of the description which follows, by referring to the attached drawing, showing, by way of example, and not limitation, a connection according to the invention and the process for its production.

DESCRIPTION OF THE DRAWINGS

FIG. 1 is a view in side elevation, with axial half section, of the connection according to the invention.

FIGS. 2, 3, and 4 and 5 illustrate the process of obtaining the connection of FIG. 1, showing, in axial section, four successive phases of applying this process.

DESCRIPTION OF PREFERRED EMBODIMENTS

Figures 1, 2, 3:
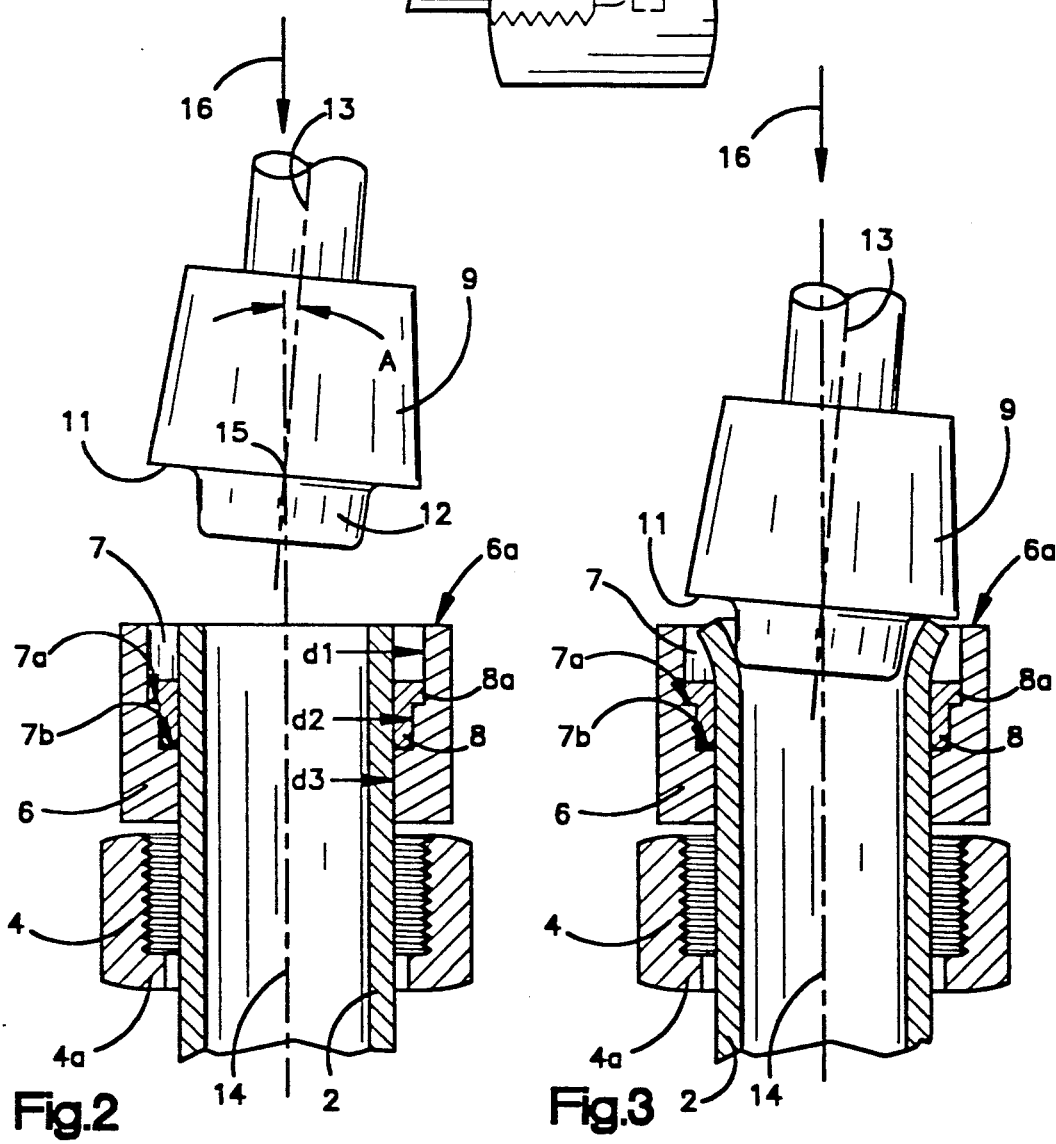

As FIG. 1 shows, the connection according to the invention is designed to permit the hermetic connection between the rigid tube 2, of steel, copper or the like, and a threaded nipple, 3, which forms a portion of and extends from a stationary apparatus or other element of an installation. The purpose of the connection is to sealingly conduct fluid under pressure. This fluid may be either hydraulic or pneumatic. The threading of the nipple 3 is, of course, of the same rise as that of the female screw or nut 4, which is to be screwed onto it.

This connection is of the type which includes a shouldered female screw or nut 4. The nut 4 has at one of its ends an inner shoulder 4a, designed to press a collar 2a formed in the end of the tube 2 against the frontal surface 3a of the nipple 3.

The sealing of this connection is generally obtained with the aid of an o-ring 5, arranged in the annular throat 5a, which is formed in the frontal surface 3a of the nipple 3 to serve it as lodging or recessed housing.

According to the invention, the collar 2a of the tube 2 is made by deforming the end of the tube 2 with a truncated cone-shaped tool or backup plate 9, as illustrated in FIGS. 2 to 5. First, since the collar 2a will prevent its removal, a nut 4 is placed on the tube so that it can be used to connect the tube after the collar 2a is formed. Next, the tube 2 is gripped in a working die 6 having a central opening passing through it which receives the tube 2. The die 6 consists of at least two complementary pieces, diametrically opposite each other, which when separated allow the die to be removed from the tube.

The imprint 7 of the die 6 has two steps or inner shoulders 7a, 7b which give it three inner diameters, d1, d2 and d3:

The diameter d1 is at least equal to the outer diameter of the collar 2a which the tube 2 is to have at the end of the beating operation.

The diameter d2, smaller than the diameter d1, is equal to the outer diameter of a socket (bushing) 8, designed to be inserted between the shoulder 4a of the female screw 4 and the tube 2. The socket 8 has, at one of its ends, an outer shoulder 8a, designed to be sandwiched between the rear surface of the collar 2a of the tube 2 and the inner shoulder 4a of the female screw 4. The diameter d2 is also equal to the inner diameter of the shoulder 4a of the female screw 4.

The diameter d3, smaller than the diameter d2, is substantially equal to the outer diameter of the tube 2 and is determined precisely, so as to assure the gripping of the tube when the die is in working position, as shown in FIGS. 2 to 4.

In the process of forming the collar 2a the tube 2 is placed in the die 6 so that its end is arranged in the same plane as the front surface 6a of the die 6. Since the depth of the first step 7a is determined according to the thickness of the shoulder 8a of the socket 8, the length of the tube 2 situated in front of the outer surface of the shoulder 8a of the socket 8 corresponds to the useful length in obtaining the collar 2a.

As the tube 2 is placed in the die 6, the die 6 grips the tube 2 to assure axial holding. Then the socket 2 is placed on the front end of the tube 2, so that, as indicated in FIGS. 2 to 5 of the drawings, its shoulder rests against the first step 7a of the imprint 7, and its cylindrical "skirt" is lodged in the part of diameter d2 of this imprint.

The deformation of the free end of the tube 2 is then carried out by the process illustrated in FIGS. 2 to 5. This process uses a tool 9, referred to herein as a backup plate, of which the working surface, directed toward the tube 2, has the form of a flat annular surface 11, surrounding a center centering elevation 12, having the form of a truncated cone. The truncated cone nose 12 is designed to be engaged in the end of the tube 2, to assure the guiding of the backup plate 9 with respect to the tube 2 as the deformation process occurs. During the deformation process the backup plate is moved in an advancing, precessing motion so that the axis of revolution 13 of the backup plate 9 is inclined at an angle A in relation to the axis 14 of the tube 2 and of the die 6. These two axes converge at the point 15, situated in the same plane as the flat annular working surface 11 of the backup plate 9.

During the deformation operation the axis 13 of the backup plate 9 is drawn by its tool holder so as to precess, i.e., describe a cone around the axis 14 of the tube 2, as shown in FIGS. 3 and 4, and to advance or be moved in the direction of the tube 2; that is, in the direction of the arrow 16.

Moreover, since the backup plate 9 is mounted in its tool holder (not shown in the drawing), through the agency of ball bearings or the like, its annular work surface 11 rolls without sliding, but with pressure, on the free end of the tube 2, deforming the latter, as shown in FIG. 3, until there is formed at this end the collar 2a, as shown in FIG. 4.

After this deforming operation is finished, since the nut 4 and the socket 8 are prisoners of the tube 2, one need only open or separate the removable and separable die portions 6 and connect the tube 2, provided with its collar 2a, to the nipple 3 for which it is intended.

What is claimed is:

1. A process for forming a tube fitting of the type having a nut which extends about a tube for joining the tube to a nipple with threads to receive the nut and with a front surface which sealingly mates with a flattened face disposed at an end of the tube, comprising the steps of:

placing a nut about the tube;

gripping the end of the tube with a die having an internal profile of a deforming the end of the tube gripped in the die to form a collar having the collar shape of the die by means of a tool having a flattened annular area to form the flattened face of the tube and a truncated cone-shaped nose insertable in the tube to guide movement of the tool with respect to the tube and by advancing the tool into the die in an advancing precessing motion.

2. The process of claim 1 which further includes the step of:

placing a socket about the end of the tube in the die so that the socket extends between the collar and the nut after the collar is formed by deforming the end of the tube.

3. The process of claim 2 which further includes the step of:

removing portions of the die form the tube by separating these portions of the die from about the collar of the tube.

* * * * *

UNITED STATES PATENT AND TRADEMARK OFFICE
CERTIFICATE OF CORRECTION

PATENT NO. : 5,131,145
DATED : July 21, 1992
INVENTOR(S) : Jean-Pierre Badoureaux It is certified that error appears in the above-indentified patent and that said Letters Patent is hereby corrected as shown below:

Claim 1, Column 4, Line 15 of the patent, the words "desired collar shape" should follow immediately after "internal profile of a..."

Claim 3, Column 4, Line 32, the word "form" should be "from".

Signed and Sealed this

Thirty-first Day of August, 1993

Attest:

BRUCE LEHMAN

Attesting Officer

Commissioner of Patents and Trademarks